(12) United States Patent
Wright et al.

(10) Patent No.: US 6,254,344 B1
(45) Date of Patent: Jul. 3, 2001

(54) SEAL

(75) Inventors: Christopher Wright; Steven V Allen, both of Bristol; Guy Saysell, Chepstow; Jonathan J Morgan, Oxford, all of (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/466,901

(22) Filed: Dec. 20, 1999

(30) Foreign Application Priority Data

Jan. 6, 1999 (GB) .................................................. 9900102

(51) Int. Cl.[7] ................................ F01D 11/00; F16J 15/16
(52) U.S. Cl. .................. 415/231; 415/174.2; 415/174.5; 277/355
(58) Field of Search ............................. 415/173.3, 173.5, 415/174.2, 174.5, 230, 231; 277/355

(56) References Cited

U.S. PATENT DOCUMENTS

| | | | |
|---|---|---|---|
| 3,837,631 | * | 9/1974 | Evans et al. ........................... 267/1.5 |
| 5,106,104 | * | 4/1992 | Atkinson et al. .................. 415/174.5 |
| 5,174,582 | * | 12/1992 | Ferguson ............................... 277/355 |
| 5,308,088 | * | 5/1994 | Atkinson et al. ..................... 277/355 |
| 5,351,971 | * | 10/1994 | Short ..................................... 277/355 |
| 5,480,160 | * | 1/1996 | Harms .................................. 277/355 |
| 5,568,931 | * | 10/1996 | Tseng et al. .......................... 277/355 |
| 6,079,945 | * | 6/2000 | Wolfe et al. .......................... 415/231 |

FOREIGN PATENT DOCUMENTS

| | | |
|---|---|---|
| 1484288 | 9/1977 | (GB) . |
| 1484936 | 9/1977 | (GB) . |
| 2193269 | 2/1988 | (GB) . |
| 0276839 A2 | 8/1988 | (GB) . |

* cited by examiner

Primary Examiner—Christopher Verdier
(74) Attorney, Agent, or Firm—W. Warren Taltavull; Manelli Denison & Selter PLLC

(57) ABSTRACT

An annular seal comprising a mass of bristles (10) packed together in a layer axially adjacent to an annular backing plate (12). The bristles (12) and backing plate (14) are mounted on and extend from a radially outer member (4) towards and around a cylindrical inner member (2). The outer (4) and inner (2) cylindrical members rotate relative to each other about an axis (1). The bristles (10) co-operate with the inner cylindrical member (2) to form a seal there-against. An expansion ring (18) is disposed radially inwardly of the backing plate (14) and is mounted in substantially the same plane from the backing plate (14) via a suitable mounting arrangement (16) which is arranged to permit radial movement of the expansion ring (18) relative to the backing plate (14) and the operational position of the inner cylindrical member (2). Frictional heating of the expansion ring (18) when the expansion ring (18) is in contact with and the inner cylindrical member (2) is arranged to cause the expansion ring (18) to expand radially away from the inner cylindrical member (2). The mounting arrangement (18) is resilient and comprises an annular spring with substantially U shaped circumferential cross section.

16 Claims, 2 Drawing Sheets

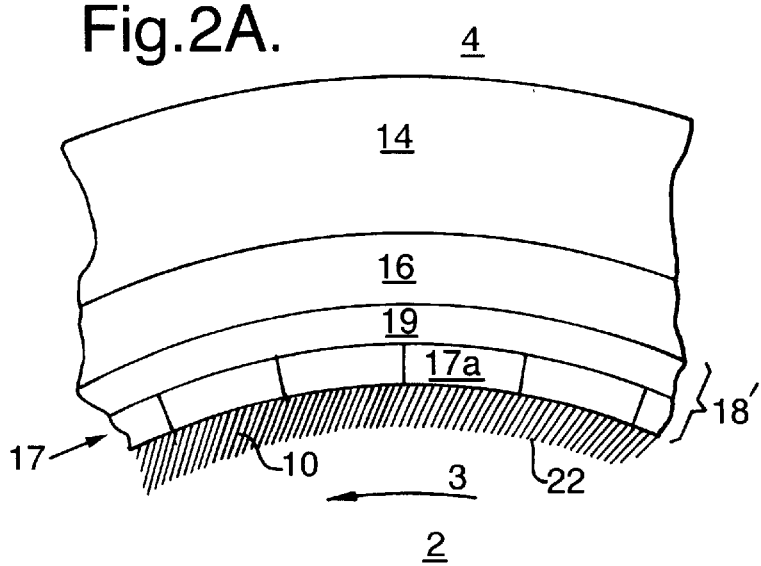
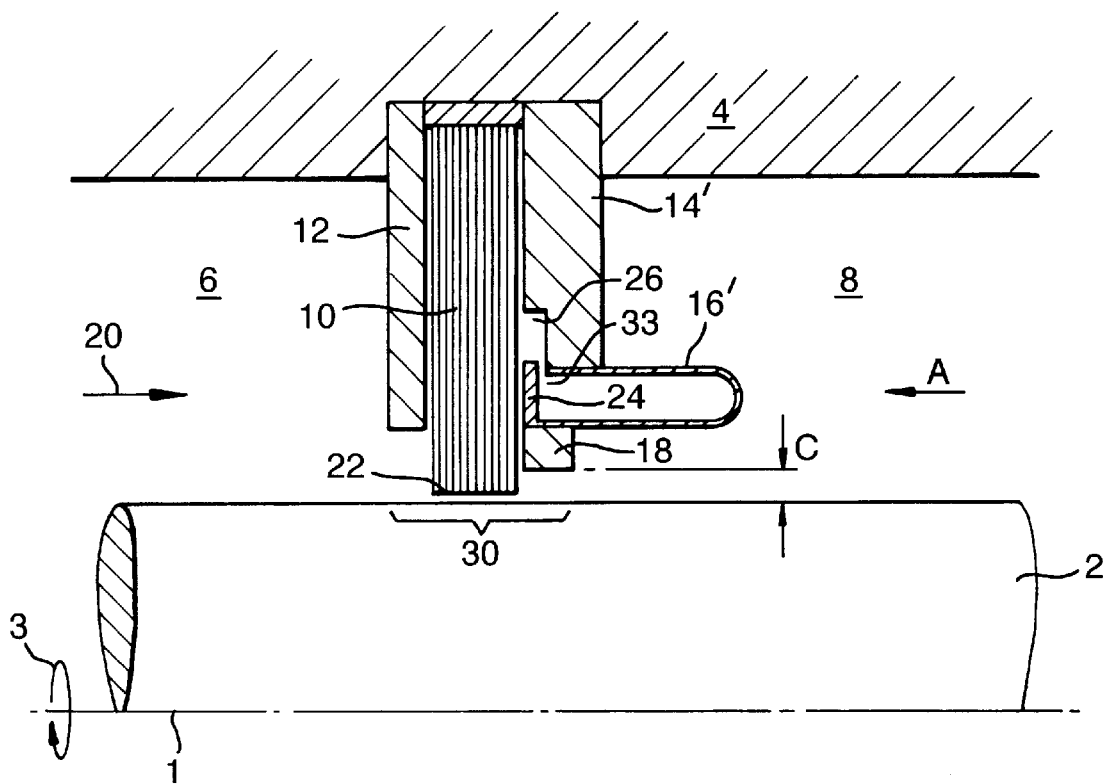

SEAL

THE FIELD OF THE INVENTION

The present invention relates generally to a seal arrangement and in particular to improvements to brush seals.

BACKGROUND OF THE INVENTION

It is often necessary to effect a fluid tight seal between two components, and in particular between a rotating shaft and a stationary housing. One type of seal that has been used, especially within the gas turbine engine field, is a brush seal. Such seals have been used within gas turbine engines to seal a gap between a rotating shaft, typically rotating at high speed, and a stationary housing where regions of higher pressure and lower pressure air, which may also be at an elevated temperature, respectively exists on each side of the seal.

Brush seals comprise a plurality of densely packed bristles sandwiched between a front plate and a backing plate. The bristles, and front and backing plate, are all attached to either of the stationary housing or the rotating shaft with the bristles extending across the gap between the shaft and housing to a sealing surface on the other of the shaft or housing. The bristles extend further than the backing plate with the free ends of the bristles generally just touching the sealing surface, or being in close proximity to it. The bristles thereby present a physical barrier to the fluid so sealing the gap between the housing and shaft.

The backing plate provides axial support to the bristles and also, since it is a solid member, partially obstructs the gap between the housing and the shaft. Consequently the backing plate is generally arranged to extend across the majority of the gap between the housing and shaft with a clearance being provided between the free end of the backing plate and the sealing surface to prevent interference between the backing plate and the shaft or housing. This clearance being sealed by the bristles that extend beyond the end of the backing plate and which are compliant so as to flex in response to the shaft movement.

Differential thermal growth, centrifugal growth of the shaft, engine manoeuvring, and build tolerances can all reduce the clearance between the backing plate and the seal surface. In the worst case in which the clearance is reduced to zero the backing plate contacts the seal surface causing unacceptable irreversible damage to the backing plate and seal surface. Consequently a sufficiently large clearance is provided between the backing plate and the sealing surface to accommodate the anticipated reduction in the clearance during operation. Unfortunately the provision of such a large clearance reduces the seal performance. Additionally due to the large clearance required the bristles can bend under the backing plate further reducing the seal performance and causing damage to the bristles.

It is therefore desirable to provide a seal arrangement which addresses the above mentioned problems in which the clearance between the backing ring and the sealing surface is minimised whilst ensuring that excessive interference between the backing plate and the sealing surface does no occur. It is also desirable to provide the improvements to such seals generally.

SUMMARY OF THE INVENTION

According to the present invention there is provided an annular seal comprising a mass of bristles packed together in a layer axially adjacent to an annular backing plate, the bristles and backing plate, in use, are arranged to be mounted on and extend from a radially outer member towards and around a cylindrical inner member, the bristles having free ends which extend radially further than the backing plate and which are arranged to operationally co-operate with the inner cylindrical member to form a seal thereagainst, said outer member and inner cylindrical member arranged in use for relative rotational movement about the axis of the cylindrical inner member; characterised in that the seal further comprises an expansion ring disposed radially inwardly of the backing plate and mounted from the backing plate in substantially the same plane as the backing plate via a suitable mounting means which are arranged to permit radial movement of the expansion ring relative to the backing plate and the operational position of the inner cylindrical member.

The expansion ring mounted from the lower portion of the backing plate can move radially. Consequently the expansion ring can move radially away from the inner cylindrical member if, or when, the expansion contacts the inner cylindrical component. This alleviates the risk of damage to the inner cylindrical member and backing plate, by such contact caused by the relative movement of the backing plate and inner cylindrical member. This thereby allows the clearance between the backing member and the seal surface to be minimised during all conditions thereby improving the seal performance.

Preferably the expansion ring is adapted such that, when in use, frictional heating of the expansion ring when the expansion ring is in contact with and the inner cylindrical member causes the expansion ring to expand radially away from the inner cylindrical member.

Furthermore the expansion ring may have a low thermal mass as compared to the backing plate and inner cylindrical member. Preferably the expansion ring is made from a high expansion material.

Since the expansion ring has a low thermal mass when the expansion ring contacts the inner cylindrical component (shaft) the rapid frictional heating which occurs causes the expansion ring to rapidly expand and increase in diameter. Thereby in effect the expansion ring rapidly moves out of contact with tine inner cylindrical member.

The expansion ring may be operationally arranged to initially be in contact with the inner cylindrical member when there is no relative rotational movement.

Preferably the mounting means comprise resilient mounting means. The resilient mounting means may be biased in a radially inward direction. Preferably the mounting means comprise an annular spring with substantially U shaped circumferential cross section. The annular spring may be slotted. An annular shield member may also be provided to obstruct a flow of fluid into the open end of the annular spring.

Preferably the seal is arranged to be used with the inner cylindrical member adapted to rotate within the stationary outer member. Alternatively the annular seal may be arranged to be used with the outer member adapted to rotate about the stationary inner cylindrical member.

Preferably the expansion ring comprises at least two concentric adjacent annular section. The expansion ring may be circumferentially segmented.

A sealing surface on the inner cylindrical member may be adapted to withstand, in operation, contact between expansion ring and inner cylindrical member.

Preferably the seal is adapted to comprise a component part of a gas turbine engine.

BRIEF DESCRIPTION OF THE DRAWINGS

The present invention will now be described by way of example only with reference to the following figures in which:

FIG. 2a shows a diagrammatic axial view an arrow 2A—2A of the seal shown in FIG. 2;

FIG. 3 shows a diagrammatic cross section through a seal incorporating a further embodiment of the invention.

DETAILED DESCRIPTION OF THE INVENTION

Figure 1:
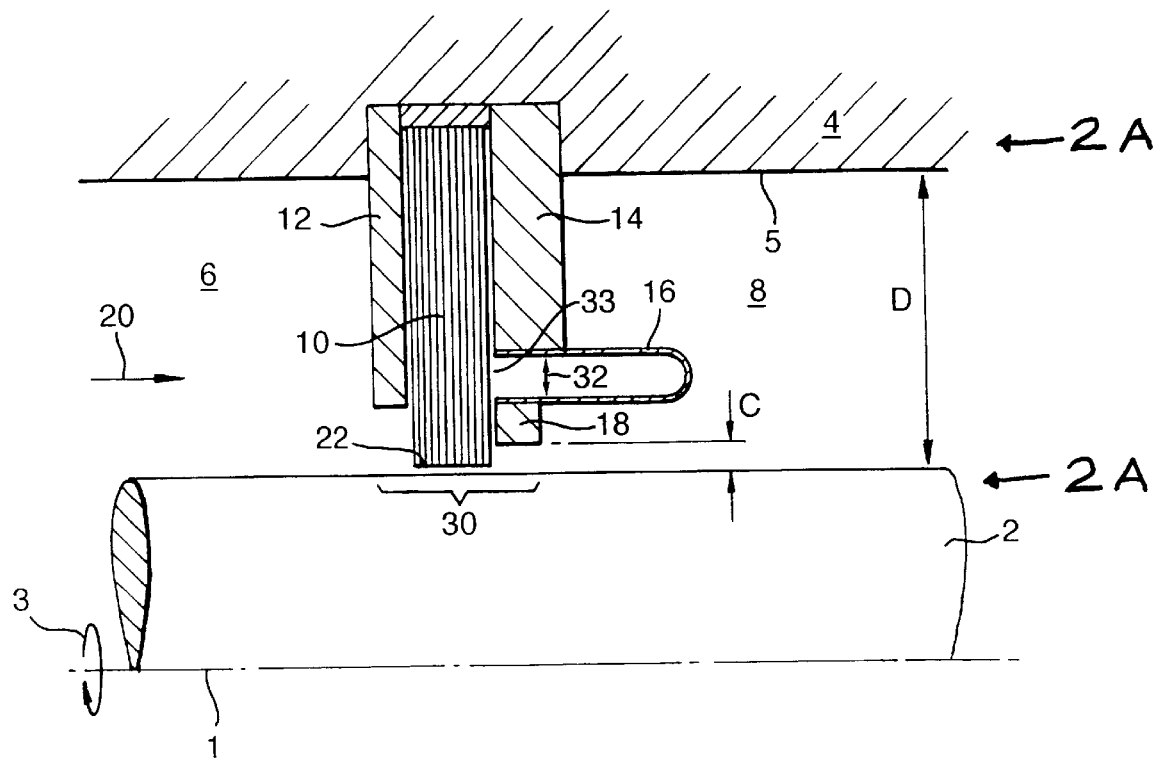
FIG. 1 shows a cross section through a seal incorporating an embodiment of the present invention.

Referring to FIG. 1 there is shown a seal according to the present invention for sealing a gap between a shaft 2 and a housing 4. The shaft 2 rotates, as shown by arrow 3 about an axis 1, within a bore 5 in the housing 4. The seal segregates a region of higher fluid pressure 6 from a region of lower fluid pressure 8 and prevents a leakage flow of fluid in a sealing direction 20 from the higher pressure region 6 to the lower pressure region 8.

The seal comprises a plurality of densely packed metallic bristles 10 sandwiched between an annular front plate 12 and an annular backing plate 14. The radially outer portions of the bristles 10, front plate 12 and backing plate 14 are all welded together such that they form a single seal unit. The bristles 10, backing plate 12, and front plate 14 are also attached at their radially outer edges to the housing 4 such that they extend radially from the housing 4 towards the shaft 2, across the gap D between the shaft 2 and housing bore 5. As is known in the art, the bristles 10 may be circumferentially angled in the direction of rotation 3 of the shaft 2, as is shown in FIG. 2a, with reference to a second embodiment of the invention. Typically the are at an angle of 45° to the radial direction. The tips 22 of the bristles 10 are arranged to just wipe against the sealing surface 30 of the shaft 2. Alternatively the tips 22 may be in very close proximity to the sealing surface 30.

An annular expansion ring 18, extending circumferentially around the shaft 2 and arranged in substantially the same plane as the backing plate 14, is mounted from the radially inner edge of the backing plate 14 via a resilient member 16. The expansion ring 18 disposed concentrically with the and radially outwardly of the operational position of the shaft 2 and radially inwardly of the backing plate 14. The expansion ring 18 effectively providing a radial extension to the backing plate 14, with the backing plate 14 supporting the bristles 10 over the majority of their radial length. The resilient member 16 comprises a thin U shaped cross section annular spring (commonly known as an annular hair spring). The two sides of the U shaped spring are connected to the radially inner edge of the backing plate 14 and the expansion ring 18 respectively. The resilient member 16 provides a flexible mounting of the expansion ring 18 from the backing plate 14 allowing the expansion ring 18 to move radially. The resilient member is biased though to urge the expansion ring radially inward, towards the seal surface 30 and the shaft 2.

The bristles 10, front plate 12, and backing plate are all made of the same materials that have been used within conventional brush seals. For example the bristles 10 are made from Haynes 25, a stainless steel, wire with each bristle having diameter of 0.070 to 0.21 mm. The expansion ring 18 is made from a low thermal mass, high expansion material for example A286 Corrosion resistant. A suitably resilient material is used for the U shaped spring 16, for example 0.25 mm gauge Nimonic 90.

The clearance C between the expansion ring 18 and seal surface 30 is very small and is considerably smaller than the typical clearance between the backing plate and seal surface of a conventional brush seal. Typically clearance C is only 0.05 to 1.0 mm. This reduced clearance C improves the seal performance. Furthermore by reducing the clearance C the length over which the bristles 10 are unsupported by a backing member (either backing plate 14 or expansion ring 18) is reduced. The expansion ring 18 acting as an extension to the backing plate 14. Bending the bristles 10 is thereby also reduced leading again to improvements in the seal performance. It being appreciated that the figures are not to scale and are only diagrammatic representations of the seals with various features, in particular the clearance C, exaggerated in the interests of clarity.

In operation the seal is exposed to high temperatures and the shaft 2 rotates at a significant speed. This is particularly so when such seals are used within gas turbine engines. Additionally when used within gas turbine engines for use on aircraft the operating conditions for some periods are not constant. These factors can all produce differential thermal expansion of the shaft 2, seal, and housing, in particular during transitional operating conditions. Centrifugal growth of the shaft 2 may also occur. Aircraft manoeuvring and misalignment of the shaft within the housing bore 5 can also lead to movement of the shaft 2 relative to the housing 4.

Movement of the shaft 2 relative to the seal causes the clearance C to be reduced. Since this clearance is very small and, unlike in other prior art seal designs is not dimensioned to accommodate such relative shaft 2 movement, the expansion ring 18 will contact the sealing surface 30 of the shaft 2. The friction produced by such contact produces rapid heating of the expansion ring 18. Since the expansion ring 18 is an annular structure the ring 18 will radially enlarge increasing its inner diameter. Due to the low thermal mass of the relatively small expansion ring 18 and the material properties (thermal conductivity and coefficient of expansion) of the expansion ring 18 and rapid heating causes the expansion ring 18 to rapidly expand. The dimensions and material of the expansion ring 18 being chosen so that it will expand due to thermal heating more rapidly than the relative growth of the shaft 2. The expansion ring 18 having a fraction of the thermal mass of the backing plate 14. Effectively therefore the expansion ring 18 will move away from, and out of contact with, the seal surface 30 of shaft 2. The resilient member 16 permitting radial movement of the ring 18 whilst keeping it coaxially aligned with the shaft 2.

Consequently with the expansion ring 18 expanding more rapidly than the relative movement of the shaft 2 little or no damage will occur to the shaft 2, expansion ring 18 and seal. The sealing surface 30 can also be suitably treated to withstand the brief periods when the expansion ring 18 contacts it before it moves away. Such a treatment may also improve the frictional heating of the expansion ring 18.

Once the expansion ring 18 is out of contact with the sealing surface 30 there is no frictional heating of the expansion ring 18 and it will cool and contract until the expansion ring again contacts the sealing surface 30 and begins to be heated. The expansion ring 18 is thereby maintained in close proximity to the sealing surface 30 with a minimum clearance C.

It will be appreciated that in alternative embodiments the seal may be arranged so that the expansion ring 18 when in a non-operational or cold state is in contact with the sealing surface 30 of the shaft 2. The clearance C only being provided by the thermal expansion of the expansion ring 18 due to the frictional heating during operation and rotation of the shaft 2. In such an arrangement the clearance C can be maintained at a minimum.

The dimensions of the resilient mounting 16 determine the extent of radial movement that the expansion ring 18 can execute. In the particular embodiment shown the radial depth 32 sets the radial maximum movement of the expansion ring 18. This radial depth being sized to allow for the maximum anticipated movement required by the expansion ring 18. The resilient mounting of expansion ring 18 also allows a degree of axial misalignment of the shaft with the housing bore 5 to be accommodated. The resilient mounting centers the expansion ring 18 about the shaft 2 during operation. The degree of misalignment that can be tolerated is also determined by the radial depth 32.

The resilient member 16 is shaped so as to reduce the stresses within it. The sides of the U shaped resilient member may also be slotted (as shown in FIG. 2A in broken lines) in other embodiments in order to reduce and/or alter the stiffness of the resilient member 16. Changes in the stiffness of the resilient member 16 affecting the response rate of the expansion ring 18 during operation.

In operation fluid can flow into the open end 33 of the resilient member 16. This ingress of fluid may have an undesirable effect upon the resilient member 16 effecting its operation. With a slotted resilient member 16 a leakage flow will also exist through such a resilient member 16. Furthermore the bristles 10 in the region of the open end 33 of the resilient member 16 are axially unsupported. Consequently there is a risk that the bristles 10 may bend in to the open end 33 of the resilient member 16. This may undesirably impede the movement of the resilient member 16 and the expansion ring 18, and produce wear of the bristles 10.

To address these possible deficiencies, particularly when a slotted resilient member 16 is used, a shield 24 can be provided to block off the open end 33 of the resilient member 16, as shown in FIG. 3. The shield 24 comprises an annular plate extending radially from one of the sides, in this case the radially inner annular side, of the U shaped annular resilient member 16. A co-operating annular groove 26 is also provided in the radially inner portion of the front face of the backing plate 14' to accept the shield 24 and allow it to slidingly move over/into the backing plate 14' as the resilient member 16 and expansion ring 18 radially move. It will be appreciated that the shield 24 could extend in the opposite direction from the radially outer side of the resilient member 16 with the expansion ring 18 being dimensioned accordingly to accommodate the shield 24.

Figure 2:
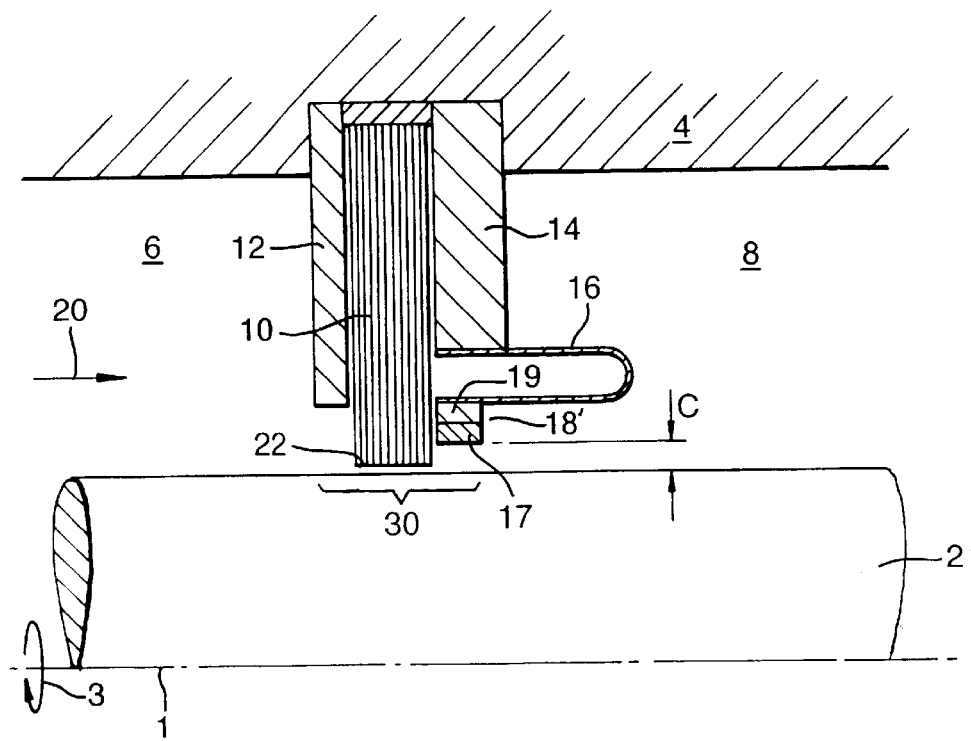
FIG. 2 shows a diagrammatic cross section through a seal incorporating a second embodiment of the invention.

Another alternative embodiment of the invention is shown in FIG. 2. The seal is generally the same as the other embodiments and operates in the same manner. As with the other figures the same reference numbers have therefore been used for like features. However, as shown in FIG. 2, in this embodiment the expansion ring 18' comprises an outer 19 section and an inner 17 section. The outer section 19 which is connected to the resilient member 16 is a solid annular hoop. The inner section 17, which is subject to contact with the sealing surface 30 of the shaft 2, comprises a number of arcuate segments 17a, attached to the outer section 18, and arranged circumferentially in an annular ring. This can more clearly be seen with reference to FIG. 2a.

The outer and inner sections of the expansion ring 18' are all made from a high thermal expansion material as with the other embodiments and again the expansion ring 18' has a low thermal mass. Additionally the inner section 17 may by made from an abradable such material in view of the fact that it will contact the sealing surface 30 during operation.

The segments 17a circumferentially abut each other and in operation the expansion ring 18' will expand, moving radially away from the shaft 2, in a similar way to the expansion ring 18 of FIG. 1. Segmenting the ring however has the advantage of relieving the stress within the expansion ring 18', in particular in the region of the expansion ring 18' that contacts the sealing surface 30 of the shaft 2 which is subject to high stresses due to the contact and the resultant frictional heating. Segmenting of the inner section of the expansion ring 18' also allows faster expansion of the outer section 19 and therefore of the expansion ring 18' as a whole.

Analysis and testing of a seal resembling that shown in FIG. 2 has shown an improved seal performance over that of a conventional seal. The seal providing self regulation of the clearance C between the expansion ring 18 and shaft 2 with minimal contact and contact loads between the expansion ring 18 and shaft 2.

It will be appreciated that in other embodiments of the invention the U shaped resilient member 16 may be replaced by any other suitable mounting arrangement that permits radial movement of the expansion ring. Such a mounting arrangement preferably being resilient and also continuous so as to prevent leakage of fluid between the radially inner edge of the backing plate 14 and the expansion ring 18.

The seal can also be configured such that the radially inner shaft 2 is stationary with the outer housing 4, from which the bristles 10 and backing plate 14 extend, rotating about the axis 1 of the stationary inner shaft 2.

Although most suitable for sealing between two relative rotating components, for example a shaft 2 and housing 4, the seal arrangement can also be used to provide to seal between two components which are only executing a limited degree of relative rotational movement.

What is claimed is:

1. An annular seal comprising an annular backing back, and a mass of bristles packed together in a layer axially adjacent to said annular backing plate, the bristles and said backing plate in use being arranged to be mounted on and extend from a radially outer member towards and around a cylindrical inner member, the bristles having free ends which extend radially farther than the backing plate and which are arranged to operationally co-operate with the inner cylindrical member to form a seal thereagainst, said outer member and inner cylindrical member being arranged in use for relative rotational movement about the axis of the cylindrical inner member;

wherein said seal further comprises an expansion ring disposed radially inwardly of the backing plate and mounted from the backing plate in substantially the same plane as the backing plate, and a suitable mounting means which mounts and attaches the expansion ring on and to the backing plate and which is arranged to permit radial movement of the expansion ring relative to the backing plate and the operational position of the inner cylindrical member, said mounting means comprising an annular spring with a substantially U shaped circumferential cross section.

2. An annular seal as claimed in claim 1 in which the expansion ring is adapted such that, when in use, frictional heating of the expansion ring when the expansion ring is in contact with the inner cylindrical member causes the expansion ring to expand radially away from the inner cylindrical member.

3. An annular seal as claimed in claim 1 in which the expansion ring has a low thermal mass as compared to the backing plate and inner cylindrical member.

4. An annular seal as claimed in claim 1 in which the expansion ring is made from a high expansion material.

5. An annular seal as claimed in claim 1 in which the expansion ring is operationally arranged to initially be in contact with the inner cylindrical member when there is no relative rotational movement.

6. An annular seal as claimed in claim 1 in which the mounting means comprises resilient mounting means.

7. An annular seal as claimed in claim 6 in which the resilient mounting means are biased in a radially inward direction.

8. An annular seal as claimed in claim 1 in which the annular spring is slotted.

9. An annular seal as claimed in clam 1 which is arranged to be used with the inner cylindrical member adapted to rotate within the stationary outer member.

10. An annular seal as claimed in claim 1 which is arranged to be used with the outer member adapted to rotate about the stationary inner cylindrical member.

11. An annular seal as claimed in claim 1 in which the expansion ring comprises at least two concentric adjacent annular sections.

12. An annular seal as claimed in claim 1 in which the expansion ring is circumferentially segmented.

13. An annular seal as claimed in claim 1 in which a sealing surface on said inner cylindrical member is adapted to withstand, in operation, contact between said expansion ring and said inner cylindrical member.

14. An annular seal as claimed in claim 1 which is adapted to comprise a component part of a gas turbine engine.

15. An annular seal comprising an annular backing plate, and a mass of bristles packed together in a layer axially adjacent to said annular backing plate, the bristles and said backing plate in use being arranged to be mounted on and extend from a radially outer member towards and around a cylindrical inner member, the bristles having free ends which extend radially father than the backing plate and which are arranged to operationally co-operate with the inner cylindrical member to form a seal thereagainst, said outer member and inner cylindrical member being arranged in use for relative rotational movement about the axis of the cylindrical inner member;

wherein said seal further comprises an expansion ring disposed radially inwardly of the backing plate and mounted from the backing plate in substantially the same plane as the backing plate, and a suitable mounting means which mounts and attaches the expansion ring on and to the backing plate and which is arranged to permit radial movement of the expansion ring relative to the backing plate and the operational position of the inner cylindrical member, said mounting means comprising an annular spring with a substantially U shaped circumferential cross section, and an annular shield member being provided to obstruct a flow of fluid into the open end of the annular spring.

16. An annular seal comprising an annular backing plate, and a mass of bristles packed together in a layer axially adjacent to said annular backing plate, the bristles and said backing plate in use being arranged to be mounted on and extend from a radially outer member towards and around a cylindrical inner member, the bristles having free ends which extend radially farther than the backing plate and which are arranged to operationally co-operate with the inner cylindrical member to form a seal thereagainst, said outer member and inner cylindrical member being arranged in use for relative rotational movement about the axis of the cylindrical inner member;

wherein said seal further comprises an expansion ring disposed radially inwardly of the backing plate and mounted from the backing plate in substantially the same plane as the backing plate, and a suitable mounting means which mounts and attaches the expansion ring on and the backing plate and which is arranged to permit radial movement of the expansion ring relative to the backing plate and the operational position of the inner cylindrical member, said annular spring being slotted, and an annular shield member being provided to obstruct a flow of fluid into the open end of the annular spring.

* * * * *